United States Patent [19]

Williamson

[11] 4,111,671
[45] Sep. 5, 1978

[54] METHOD AND APPARATUS FOR CARBON DIOXIDE SNOW SEPARATION

[75] Inventor: Hilding Victor Williamson, Hanover, Pa.

[73] Assignee: Chemetron Corporation, Chicago, Ill.

[21] Appl. No.: 770,465

[22] Filed: Feb. 22, 1977

Related U.S. Application Data

[63] Continuation of Ser. No. 588,550, Jun. 19, 1975, abandoned.

[51] Int. Cl.² .............................................. F25J 1/00
[52] U.S. Cl. .......................................... 62/10; 55/461
[58] Field of Search ............................... 62/10; 55/461

[56] References Cited

U.S. PATENT DOCUMENTS

| 676,969 | 6/1901 | Stebbins | 55/461 |
|---|---|---|---|
| 1,546,682 | 7/1925 | Slate | 62/10 |
| 2,357,039 | 8/1944 | Williamson | 55/434 |
| 2,486,624 | 11/1949 | Williamson | 62/10 |
| 3,757,367 | 9/1973 | Campbell | 55/461 |
| 3,833,480 | 9/1974 | Bidard | 55/461 |

*Primary Examiner*—Norman Yudkoff
*Attorney, Agent, or Firm*—Vincent G. Gioia

[57] ABSTRACT

A method and related apparatus for separating carbon dioxide snow from a mixture of carbon dioxide snow and vapor is disclosed. A mixture of carbon dioxide snow and vapor is introduced into a rectangular conduit which has an inlet end, an outlet end, a discharge orifice and continuously increasing cross-section from said inlet end to said discharge orifice. At least a portion of the conduit between the inlet end and the discharge orifice is curved to define a flow path for the mixture such that carbon dioxide snow tends to be concentrated for flow in a concentrated stream through said path. Means for deflecting a portion of the mixture after it passes through said discharge orifice is also provided.

8 Claims, 4 Drawing Figures

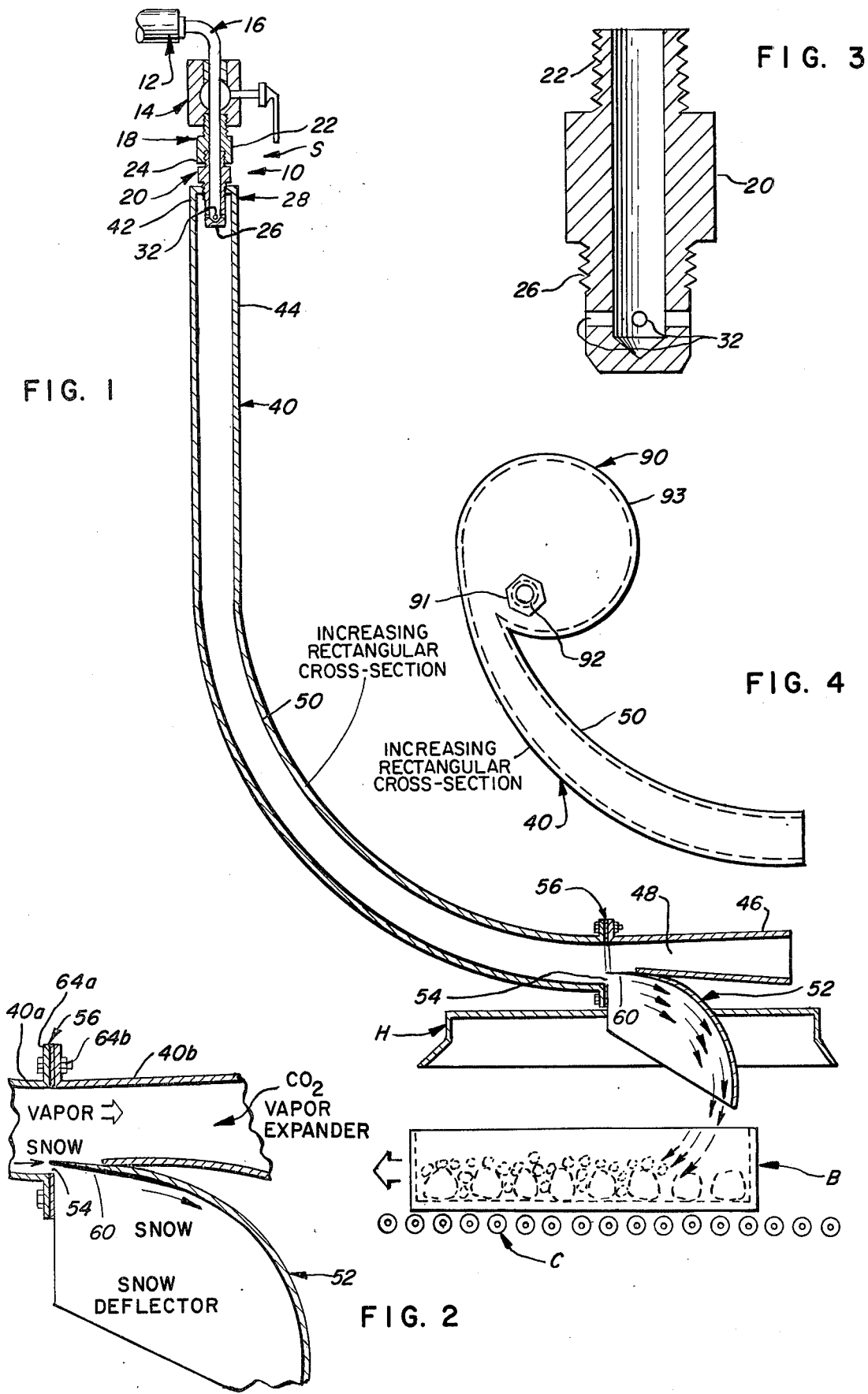

METHOD AND APPARATUS FOR CARBON DIOXIDE SNOW SEPARATION

CROSS REFERENCE TO RELATED PATENT APPLICATION

This application is a continuation of application Ser. No. 588,550, filed June 19, 1975, now abandoned.

BACKGROUND OF THE INVENTION

This invention relates to an improved method and apparatus for separating carbon dioxide snow from a mixture of carbon dioxide snow and vapor.

When liquefied carbon dioxide flows through a restriction in a conduit such that the pressure of the liquefied carbon dioxide is reduced from a pressure above the triple point pressure (approximately 75 psia) to a pressure below the triple point pressure, the liquefied carbon dioxide is converted to a mixture of snow and vapor. In many practical applications, as where carbon dioxide snow is to be employed as a refrigerating medium and carbon dioxide vapor is to be recovered and removed from the presence of operating personnel and recycled, it is necessary to separate carbon dioxide snow from the mixture.

By way of background, U.S. Pat. No. 3,757,367, to Campbell, issued Sept. 11, 1973, entitled "Method for Carbon Dioxide Snow Separation" and assigned to the assignee of the present application which is incorporated herein by reference, teaches an apparatus and method for carbon dioxide snow separation. In such an apparatus a flowing mixture of carbon dioxide snow and vapor is first formed from liquid carbon dioxide, and then introduced through one end of a tubular conduit, curved to define a curvilinear flow path axially through the tubular conduit, such that carbon dioxide snow tends to be concentrated in a stream flowing axially through the tubular conduit. The concentrated stream of carbon dioxide snow is deflected from the remainder of the mixture and discharged from the tubular conduit. The patentee teaches that the pressure within the inlet end portion of the tubular conduit should be maintained between 5 and 60 psig. The patentee also teaches that this apparatus is capable of recovering approximately 38% of the liquid carbon dioxide as carbon dioxide snow, whereas the theoretical percentage of snow formed is 48%. The apparatus thus recovers approximately 79% of the snow that is present in the flowing mixture of carbon dioxide snow and vapor, thus the utility of the remaining 21% of the snow is being lost.

From the foregoing, it is apparent that there remains a need for an improved method and apparatus for efficiently separating carbon dioxide snow from a mixture of carbon dioxide snow and vapor.

It therefore becomes an object of this invention to provide an improved method and apparatus for efficiently separating carbon dioxide snow from a mixture of carbon dioxide snow and vapor. Other objects will become apparent from the following description of the invention.

SUMMARY OF THE INVENTION

The objects of this invention may be accomplished by an apparatus comprising a conduit having an inlet end, an outlet end, and a discharge orifice between said ends, said conduit having a rectangular cross-section continuously increasing from said inlet end to said discharge orifice, means for introducing a mixture of carbon dioxide snow and vapor into said conduit for flow from said inlet end toward said outlet end, at least a portion of said conduit between said inlet end and said discharge orifice being curved to define a flow path for the mixture such that carbon dioxide snow tends to flow in a concentrated stream through the conduit and is discharged through said orifice. Means for deflecting a portion of the mixture after it passes through said discharge orifice is also provided.

Similarly, the objects of this invention may be accomplished by a method comprising the steps of expanding a stream of liquid carbon dioxide to a pressure below the triple point to form a flowing mixture of carbon dioxide snow and vapor, introducing said flowing mixture into an inlet end of a conduit, conducting said mixture in a curvilinear path through a continuously increasing rectangular cross-section of said conduit and in axial relationship to said conduit whereby said flow occurs at sub-atmospheric pressure and said snow is concentrated in a stream flowing axially through said conduit, and discharging said concentrated stream of snow from said conduit.

BRIEF DESCRIPTION OF THE DRAWINGS

FIG. 1 is an elevational view, partly in cross-section, showing apparatus embodying this invention as included in a system for delivering carbon dioxide snow for use as a refrigerating medium.

FIG. 2 is a fragmentary view, on an enlarged scale, showing a detail of the apparatus of FIG. 1.

FIG. 3 is a isolated view, on an enlarged scale, showing a detail of the apparatus of FIG. 1.

FIG. 4 is a fragmentary view showing a detail of a modification of the apparatus of FIG. 1.

DESCRIPTION OF THE PREFERRED EMBODIMENT

In FIG. 1, an apparatus 10 embodying this invention for separating carbon dioxide snow from a mixture of carbon dioxide snow and vapor is shown as included in a system S for deliverying carbon dioxide snow for uses as a refrigerating medium. As shown, a box B containing perishable foodstuffs or the like is supported by means of a conveyor C for movement beneath a hood H shielding the apparatus 10. Uses of carbon dioxide snow as a refrigerating medium are well known and are exemplified in U.S. Pat. Nos. 3,320,075 and 3,498,799.

The system S also includes a source 12 of a liquefied carbon dioxide, a conventional ball valve 14 connected and arranged to control the flow of liquefied carbon dioxide from the source 12 to the apparatus 10 through a tubular conduit 16 leading from the source 12 to the valve 14 and through a conduit 18 leading from the valve 14 to the apparatus 10, and an orifice nozzle 20 connected between the tubular conduit 18 and the apparatus 10. As shown, the inlet end 22 of the orifice nozzle 20 is externally threaded for threaded connection to an internally threaded end portion 24 of the conduit 18, and the outlet end 26 of the orifice nozzle 20 similarly is externally threaded for threaded connection to an internally threaded coupling 28.

As shown, the outlet end 26 of the orifice nozzle 20 includes four orifices 32 drilled or otherwise formed therein being radially disposed about outlet end 26 to define restricted passageways for liquefied carbon dioxide flowing from the source 12 to the apparatus 10 through the orifice nozzle 20. Alternatively, the four radially disposed orifices 32 could be replaced by an orifice plate with a single axially disposed orifice as shown in FIG. 1 of U.S. Pat. No. 3,757,367.

The apparatus 10, which is supported generally within the hood H of the system S, generally comprises a rectangular conduit 40. As shown, the rectangular conduit 40 has an inlet end 42, which is adapted to receive a mixture of carbon dioxide snow and vapor for flow through the rectangular conduit 40, and an elongated straight inlet end portion 44, which includes the inlet end 42. As shown, the coupling 28 is brazed or otherwise suitably mounted to the inlet end 42 of the rectangular conduit 40. The conduit 40 further has an outlet end 46, which is adapted to discharge a portion of the mixture flowing through the rectangular conduit 40, an elongated tapered outlet end portion 48, which includes the outlet end 46, and an elongated curved portion 50 between the inlet end portion 44 and the outlet end portion 48. The apparatus 10 further generally comprises means 52 for deflecting a portion of the mixture after said mixture passes through the discharge orifice 54.

In order to minimize the length of the curved portion 50 of the rectangular conduit 40 necessary for efficient concentration of carbon dioxide snow, the inlet end portion 44 of the rectangular conduit 40 should be elongated to eliminate turbulance in the cross-section of the rectangular conduit 40 before entering the curved portion 50 of the conduit 40. As shown, the length of the inlet end portion 44 of the rectangular conduit 40 is approximately 40 percent of the overall length of the rectangular conduit 40.

The ratio of the cross-sectional area of the discharge orifice 54 to the cross-sectional area of the rectangular conduit 40 at the connection 56 is preferably 1:8 for optimum removal of snow. A ratio larger than 1:8 will cause additional undesired carbon dioxide vapor to be removed through the orifice 54 while a ratio below 1:8 will cause desired carbon dioxide snow to pass by orifice 54 and be discharged through outlet end 46. As shown, the orifice 54, defined by rectangular conduit 40 and blade 60, is located in the curved portion 50 of the rectangular conduit 40, and the deflecting means 52, which in a preferred embodiment comprises a blade 60, is positioned to deflect the concentrated stream of carbon dioxide snow along a flow path intersecting the path defined by the curved portion 50 of the rectangular conduit 40. For convenience in mounting the blade 60 as shown, the rectangular conduit 40 may be made in two sections 40a and 40b, respectively, brazed or otherwise suitably joined together at a connection 56 between a flange 64a on the section 40a and a flange 64b on the section 40b. However, blade 60 may be separately attached to rectangular conduit 40 to define orifice 54 at connection 56.

As an alternative to using an elongated inlet portion 44, the alternative embodiment shown in FIG. 4 may be employed. In this embodiment the circular section 90 is suitably connected directly to the curved portion 50 of tubular conduit 40. An orifice nozzle 91 including the orifice 92 which defines a restricted passageway for liquefied carbon dioxide flowing from the source 12 to the apparatus 10 through orifice nozzle 91 is provided inside of circular section 90 to discharge carbon dioxide tangentially to the perimeter 93 of circular section 90.

In operation, liquid carbon dioxide is expanded through orifices 32 to a pressure below the triple point to form carbon dioxide snow and vapor. The resulting mixture of carbon dioxide snow and vapor flows through conduit 40 by first entering inlet end portion 44 wherein the mixture uniformly fills the conduit. The mixture flows through inlet end portion 44 at a relatively high velocity and enters curved portion 50. Since the snow is much heavier than the vapor, the snow is deflected to the outside radius of curved portion 50. The rectangular cross-section of curved portion 50 allows the centrifugal forces which are exerted on the mixture to be balanced or to form a uniform force field.

In a snow separator of the design shown in U.S. Pat. No. 3,757,367 the carbon dioxide snow and vapor mixture passes through a conduit having a round cross-section. In such an apparatus the centrifugal forces are unbalanced or now uniform across the conduit thus allowing eddy-flow circulation to interfere with the concentrated flow of snow, causing it to be erratically displaced from the desired flow path along the outer radius of the conduit. In the snow separator of the present invention, balanced centrifugal forces prevent eddy-flow circulation and allow the snow to flow in a thin, concentrated stream along the outside radius of curved portion 50 until it passes through discharge orifice 54. The snow is separated by blade 60 and deflected by deflecting means 52 and directed to a point of use. It is understood that deflecting means 52 is not necessary to the operation of the apparatus since snow will exit orifice 54 without deflecting means 52 being present. Deflecting means 52 is merely a convenient means for conveying the snow to the desired point of use.

The tapered rectangular conduit 40 uniformly increases in cross-sectional area from the inlet end 42 to the discharge orifice 54. This allows the pressure in the conduit 40 to be below atmospheric pressure. This pressure condition is in sharp contrast to the operating characteristic of the device shown in U.S. Pat. No. 3,757,367 in which the desired pressure is above atmospheric pressure.

The low pressure condition inside the conduit 40 yields three very desirable benefits. It is well known from thermodynamic principles that for a given temperature, the percentage of liquid carbon dioxide that is converted into snow is greater at low pressures than at high pressures. Thus, the lower pressure operation of the apparatus of this invention allows a greater percentage of snow to be formed from a given amount of liquid carbon dioxide. After the separation of the mixture has occurred by virtue of the snow passing through exit orifice 54, the pressure in end portion 48 of conduit 40 can be increased by providing end portion 48 with a sufficient degree of taper to compensate for the reducing velocity of flow due to friction.

A second desirable benefit of operating at a low pressure is that a lower pressure at the exit orifice 54 causes less carbon dioxide gas to also exit through orifice 54. Thus, the lower pressure operation allows less of the undersired gas to exit with the desired snow.

A third desirable characteristic of low pressure operation is founded in other thermodynamic considerations. Just as the snow is moved by centrifugal force to the outside of curved portion 50, the vapor is also influenced by centrifugal force so that a pressure gradient developes between the inside radius and the outside radius of curved portion 50. This pressure differential causes the vapor near the inner wall of curved portion 50 to be colder than the vapor near the outside wall, under the well known vortex-tube principle. This effect is not desirable in the apparatus of this invention since the snow flowing along the path near the outside wall of curved portion 50 is caused to be in contact with the warmer vapor, causing some of the snow to sublime. It is therefore desirable to minimize this vortex-tube effect by reducing the operating pressure so that the density of the vapor will be less and the pressure gradient minimized. The apparatus of this invention, operating at low pressure, accomplishes this desired reduction in the vortex-tube effect.

Outlet end 46 may be connected to a means for recovering carbon dioxide vapor to enable the vapor to be recycled as shown in the drawings. Alternatively, the carbon dioxide vapor passing through outlet end 46 may be vented to the atmosphere away from operating personnel.

An apparatus substantially as described was constructed having a cross-sectional area of 3 square inches at the inlet end 42 and a cross-sectional area of four square inches at the connection 56. The radius of the curved portion 50 was 18 inches and the length of the inlet end portion 44 was 18 inches. Liquid carbon dioxide was introduced through orifices 32 at a rate of 75 pounds per minute. Snow passed through orifice 54 at the rate of 32 to 32 and one-half pounds per minute while snow passed through outlet end 46 at a rate of only one-tenth pound per minute. The apparatus thus recovered or removed approximately 99 percent of the carbon dioxide snow available in the discharge stream at connection 56. For a liquid carbon dioxide flow rate of 75 lbs/min the apparatus also recovered 43 percent of the carbon dioxide as snow from the maximum or a theoretical 46 to 48 percent production of snow as calculated from thermodynamic principles. The apparatus therefore recovered at least 90 percent of the maximum or theoretical amount of carbon dioxide snow that could have been available.

What I claim is:

1. A method of separating carbon dioxide snow from a mixture of carbon dioxide snow and vapor comprising the steps of:
    expanding a stream of liquid carbon dioxide to a pressure below the thermodynamic triple point into an inlet end of a continuously increasing rectangular cross-section conduit to form a flowing mixture of carbon dioxide snow and vapor;
    conducting said mixture at sub-atmospheric pressure in a curvilinear path defined by said conduit to subject said flowing mixture to a uniform field of centrifugal forces, whereby said snow is concentrated in a stream in the region having the largest centrifugal force; and
    separating said concentrated stream of snow from said vapor by a physical barrier to discharge said concentrated stream of snow from said conduit.

2. The method of claim 1 further including, after the step characterized by expanding, the step of conducting said mixture in a straight path formed by said conduit between said inlet end and said curvilinear path to substantially eliminate turbulence in said carbon dioxide snow and vapor mixture.

3. The method of claim 2 further including the step of recovering said separated carbon dioxide vapor for subsequent recycling.

4. An apparatus for separting carbon dioxide snow from a mixture of carbon dioxide snow and vapor comprising:
    a continuously increasing rectangular cross-section conduit having an inlet end, an outlet end, and a discharge orifice adjacent to said outlet end;
    means in said inlet end for introducing a mixture of carbon dioxide snow and vapor into said conduit thereby causing a flow of the mixture from said inlet end toward said outlet end;
    said conduit having a curved portion between said inlet end and said discharge orifice shaped so that the two curved walls of said conduit form a flow path for the mixture such that carbon dioxide snow tends to flow in a concentrated stream through said conduit at or near the surface defined by the larger radius, and
    blade means attached to said conduit at said discharge orifice establishing the size of said discharge orifice and providing physical separation for siad carbon dioxide snow from said vapor.

5. The apparatus of claim 4 wherein said conduit includes a straight portion located between said inlet end and said curved portion, for substantially eliminating turbulence in said carbon dioxide snow and vapor mixture before it enters said curved portion.

6. The apparatus of claim 5 wherein said straight portion comprises 40% of the total length of said conduit.

7. The apparatus of claim 6 wherein the ratio of the area of said discharge orifice to the cross sectional area of said conduit at the location of said discharge orifice is 1:8.

8. The apparatus of claim 7 further including recovery means attached to said conduit at said outlet end for recovering said separated carbon dioxide vapor for subsequent recycling.

* * * * *